(12) United States Patent
Hammerschmidt

(10) Patent No.: US 7,980,134 B2
(45) Date of Patent: Jul. 19, 2011

(54) MEASURING DEVICE AND MEASURED QUANTITY SENSOR HAVING COUPLED PROCESSING AND EXCITATION FREQUENCIES

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 1226 days.

(21) Appl. No.: 11/608,592

(22) Filed: Dec. 8, 2006

(65) Prior Publication Data

US 2008/0126015 A1    May 29, 2008

(30) Foreign Application Priority Data

Nov. 24, 2006 (DE) .................. 10 2006 055 589

(51) Int. Cl.
*G01P 9/04* (2006.01)
(52) U.S. Cl. .................................................. 73/504.12
(58) Field of Classification Search .......... 73/504.12, 73/504.04, 504.02, 504.14, 504.15, 504.16
See application file for complete search history.

(56) References Cited

U.S. PATENT DOCUMENTS

| | | | |
|---|---|---|---|
| 5,162,723 A | 11/1992 | Marzalek et al. | |
| 5,400,269 A * | 3/1995 | White et al. | 702/190 |
| 5,444,639 A * | 8/1995 | White | 708/300 |
| 5,600,063 A * | 2/1997 | Ogawa | 73/504.03 |
| 6,276,204 B1 * | 8/2001 | Townsend | 73/504.12 |
| 6,298,709 B1 | 10/2001 | Artzner et al. | |
| 6,934,665 B2 * | 8/2005 | Rober | 702/189 |
| 7,054,778 B2 | 5/2006 | Geiger et al. | |
| 7,216,538 B2 | 5/2007 | Ito et al. | |
| 7,243,542 B2 * | 7/2007 | Hulsing, II | 73/514.02 |
| 7,275,433 B2 * | 10/2007 | Caminada et al. | 73/514.18 |
| 7,305,880 B2 * | 12/2007 | Caminada et al. | 73/504.04 |
| 7,805,993 B2 * | 10/2010 | Spahlinger | 73/504.02 |

FOREIGN PATENT DOCUMENTS

| | | |
|---|---|---|
| DE | 2459113 | 6/1976 |
| EP | 1788351 A1 | 5/2007 |
| WO | 2004/008071 A1 | 1/2004 |
| WO | WO 2004/023075 A1 | 3/2004 |
| WO | 2004/046650 A1 | 6/2004 |

* cited by examiner

*Primary Examiner* — Helen C. Kwok
(74) *Attorney, Agent, or Firm* — Eschweiler & Associates, LLC

(57) ABSTRACT

A measuring device for determining a measured quantity having an oscillatory structure where an oscillation signal is detectable. The measuring device further includes a device for exciting the oscillatory structure by an excitation frequency to result in an oscillation of an oscillation frequency. The measuring device further has a device for processing the oscillation signal by a frequency depending on the oscillation frequency and the excitation frequency. Furthermore, the measuring device includes an evaluator for determining the measured quantity based on the oscillation signal processed.

53 Claims, 8 Drawing Sheets

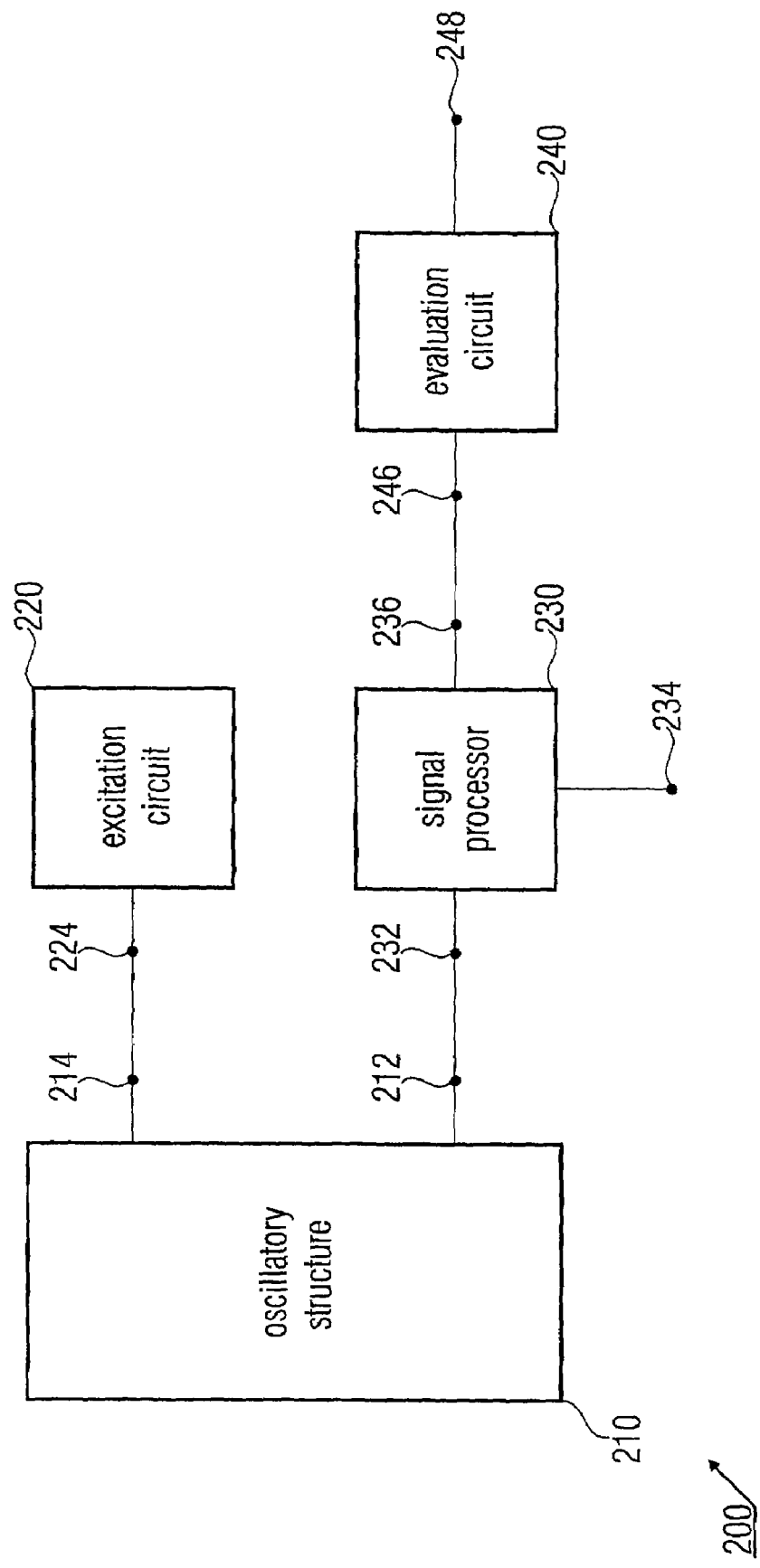

MEASURING DEVICE AND MEASURED QUANTITY SENSOR HAVING COUPLED PROCESSING AND EXCITATION FREQUENCIES

RELATED APPLICATIONS

This application claims priority from German Patent Application No. 10 2006 055 589.9, which was filed on Nov. 24, 2006, and is incorporated herein by reference in its entirety.

TECHNICAL FIELD

The present invention relates to a measuring device and to a measured quantity sensor for determining a measured quantity, such as, for example, a rate of rotation or acceleration, as are present in various fields of application.

BACKGROUND

A way of measuring rotational speeds and accelerations is, for example, using micro-mechanical gyroscopes, i.e. rotational rate sensors. These rotational rate sensors may exemplarily make use of the Coriolis force to find out a rotational speed or acceleration. In conventional rotational rate sensors, micro-mechanical resonators are, for example, put in controlled oscillation for this purpose which is also referred to as excitation oscillation. The oscillating structure formed in this way additionally comprises another resonant mode which is coupled to the excited mode, for example proportional to the Coriolis force and thus the rotational rate. The result is the possibility of utilizing an oscillation of the second resonant mode which is also referred to as detection oscillation for measuring the rotational rate.

In conventional technology, sigma-delta modulators are used for measuring the rotational rate, i.e., for example, for detecting the amplitudes of excitation and detection oscillations, the noise suppression characteristic of which can be adjusted such that they achieve the best quantizing noise suppression possible in the excitation frequency. Deviations occurring between the frequency of the maximum attenuation of the sigma-delta noise transfer function and the true oscillation frequency may result in a deterioration in the system performance due to increased noise in the signal band which cannot be attenuated or suppressed, not even by filtering.

SUMMARY

According to an embodiment, the present invention may include a measuring device for determining a measured quantity including an oscillatory structure in which an oscillation signal is detectable. In addition, the measuring device may comprise means for exciting the oscillatory structure by an excitation frequency to result in an oscillation of an oscillation frequency. In addition, the measuring device may include means for processing the oscillation signal synchronous to the oscillation frequency or the excitation frequency and evaluating means for determining the measured quantity based on the oscillation signal processed.

BRIEF DESCRIPTION OF THE DRAWINGS

Different embodiments will be detailed subsequently referring to the appended drawings, in which:

FIG. 2 shows an embodiment of a measured quantity sensor.

DETAILED DESCRIPTION

Figure 1A:
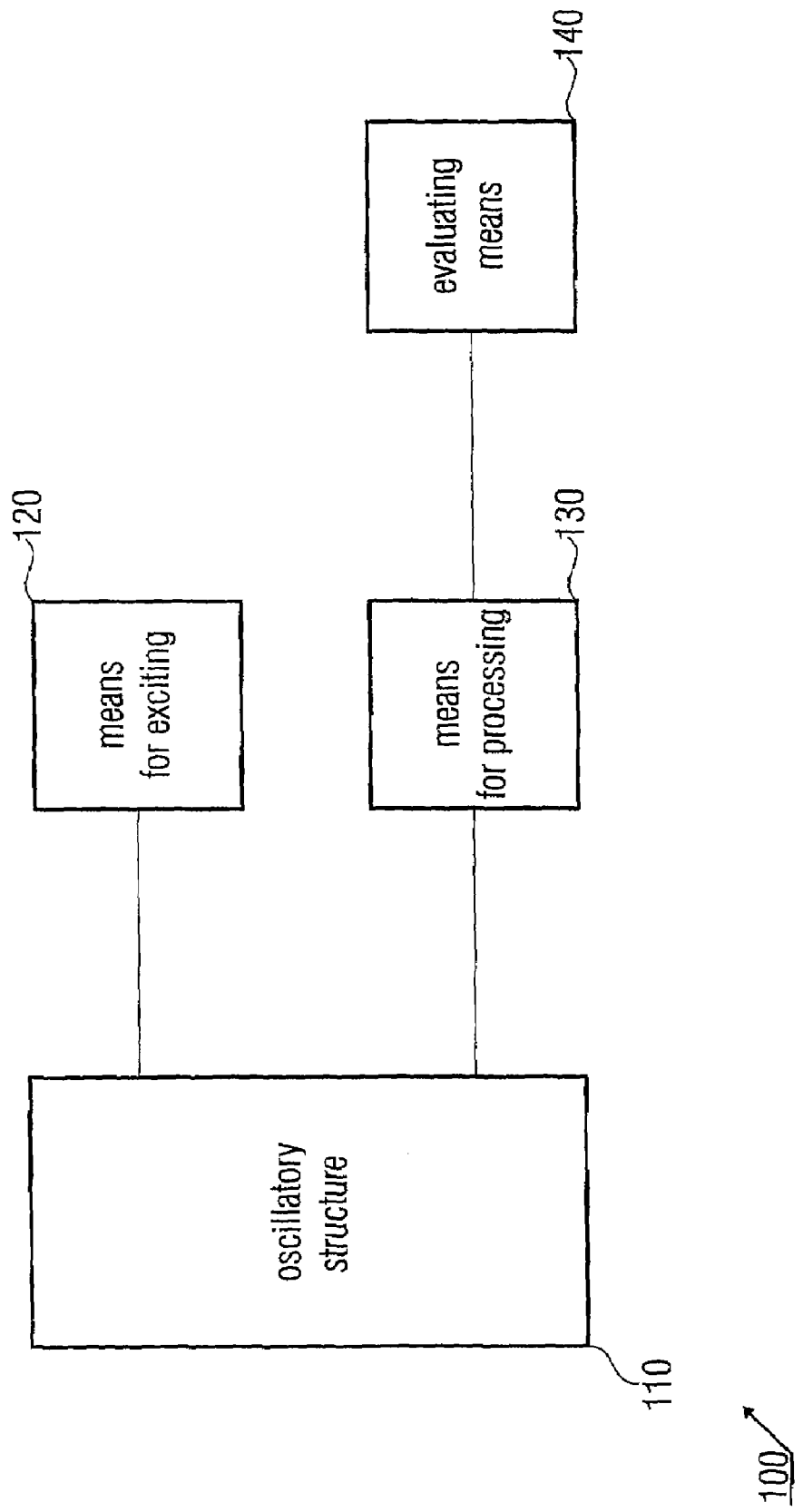
FIG. 1a shows an embodiment of a measuring device.

Before embodiments will be discussed in greater detail below referring to the drawings, it is to be pointed out that same elements in the figures are provided with same or similar reference numerals and that a repeated description of these elements is omitted.

Frequencies of discrete-time signal processing circuits, such as, for example, a system clock frequency, are defined in a digital or analog manner, exemplarily by capacitance ratios. In order for coefficients, such as, for example, of digital filters, to be well controllable, there is the possibility of coupling all frequencies proportionately to the frequency of an excitation oscillation of a sensor, such as, for example, of a gyroscope or rotational rate sensor. The frequencies of the signal-processing components are thus dependent on the excitation frequency, which offers the possibility of increasing the precision of the coefficient setting and achieving better adjustment between an oscillation frequency of a sensor which may be subject to tolerances and subsequent signal processing. Exemplarily, the zero values of a noise-shaping function of an analog-to-digital or digital-to-analog transducer and center frequencies of subsequent filters can be matched well to the excitation frequency. This generally is also true for the entire further signal processing which may, for example, be composed of regulators for controlling the excitation oscillation and compensation of the detection oscillation. The clock may, for example, be used for the digital demodulation of the detection signal, and maybe also for subsequent filters and, for example, also for compensation in a force-feedback circuit.

Embodiments using sensors for determining measured quantities the excitation frequency of which is coupled to a clock frequency of subsequent signal processing are described subsequently. This, for example, allows using filters, DA and AD transducers, regulators etc. having a smaller tolerance range in the frequency range than in conventional systems since the tolerance range is no longer fixed but may shift with the excitation frequency. A more preferable filter characteristic is achieved by coupling the excitation frequency to the clock frequency of the signal processing, also resulting in improved noise suppression. Measured quantities preferably used here are, but are not limited to, rotation rates, accelerations, forces, pressures etc.

When using fixed frequency characteristics not including coupling between an excitation frequency and a clock frequency, disadvantages may, for example, arise in sigma-delta DA transducers which are, for example, used for generating the excitation oscillation or for adjusting a detection oscillation in force-feedback operation. These problems may also occur in filters which allow selective measurement of the oscillation amplitudes and suppress interferences or noise at other frequencies, such as, for example, quantizing noise shifted by noise shaping. Since the passband and stopband frequencies in filters are sometimes to be close to each other, the filter structures can become very complex due to high quality requirements. The requirements may be even more critical if the range available for the transition between passband and stopband is narrowed further by manufacturing tolerances of frequencies designed by the mechanics of a sensor.

When AD transducers, filters and regulators use fixed frequency definitions, sensors may be optimized such that the result is the most stable frequency characteristic possible. Trimming or temperature compensation of the oscillator frequencies may, for example, be performed in a final test to optimize adjustment of the signal processing to the individual sensors. This, in turn, increases test times and, when the adjustment fails, the yield may be reduced due to discarding.

FIG. 1a shows an embodiment of a measuring device 100 for determining a measured quantity. The measuring device 100 includes an oscillatory structure 110 where an oscillation signal is detectable. In addition, the measuring device 100 comprises means for exciting the oscillatory structure 110 by an excitation frequency to result in an oscillation of an oscillation frequency. The measuring device 100 further includes means 130 for processing the oscillation signal by a frequency depending on the oscillation frequency or the excitation frequency. The measuring device 100 additionally comprises evaluating means 140 for determining the measured quantity based on the oscillation signal processed.

Figure 1B:
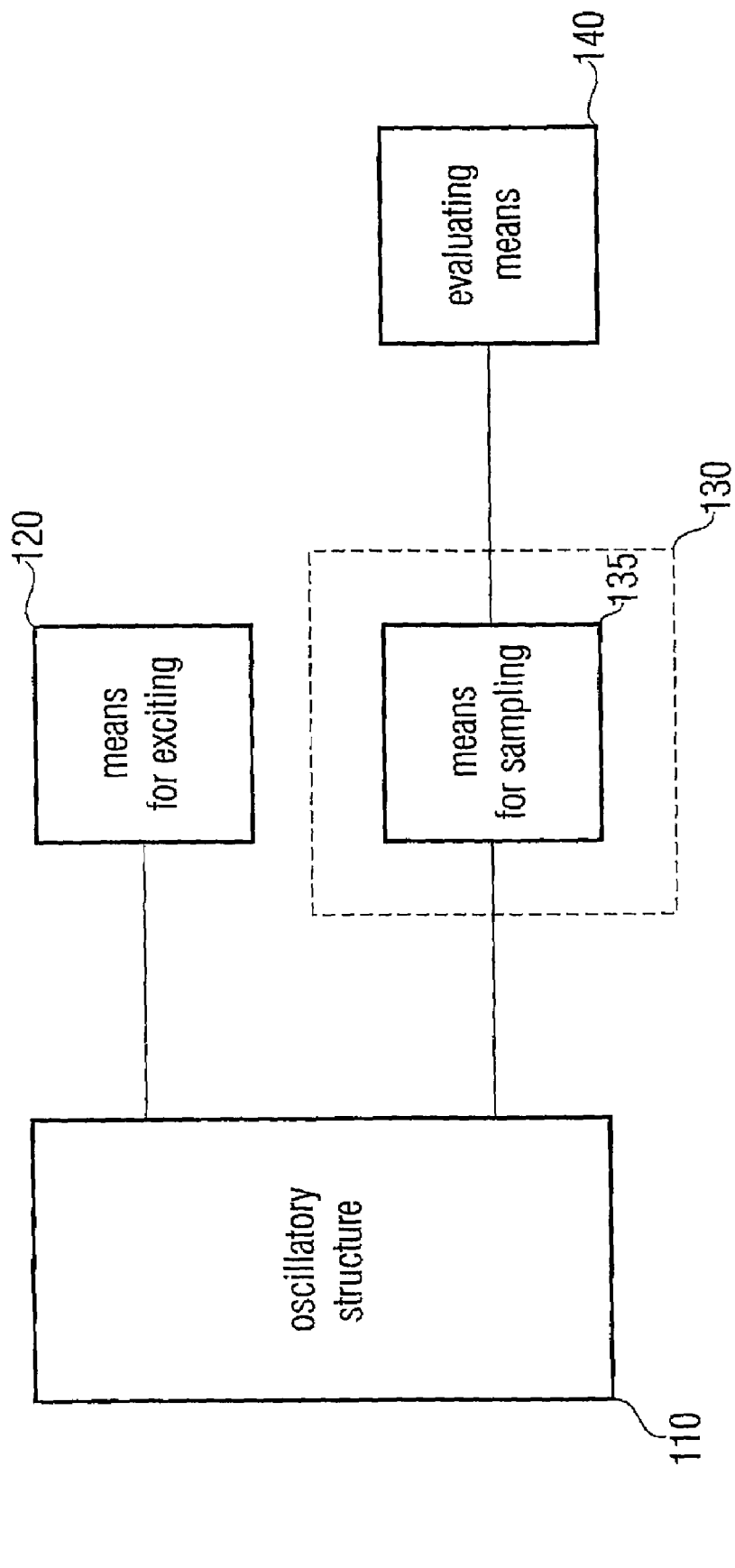
FIG. 1b shows another embodiment of a measuring device.

FIG. 1b shows another embodiment of the measuring device 100 for determining the measured quantity. The measuring device also includes the oscillatory structure 110 where the oscillation signal is detectable. In addition, the measuring device 100 comprises the means 110 for exciting the oscillatory structure by the excitation frequency to result in the oscillation of the oscillation frequency. The measuring device 100 also includes the means 130 for processing which in this embodiment is realized as means for sampling 135 the oscillation signal by a sample frequency depending on the oscillation frequency or the excitation frequency. The measuring device 100 also comprises the evaluating means 140 for determining the measured quantity based on the sampled oscillation signal.

In other embodiments, the means for processing 130 may, for example, comprise a filter the filter characteristic of which depends on the oscillation frequency or the excitation frequency. A possible realization would, for example, be an analog filter the filter characteristic of which depends on an impedance which in turn is adjustable in dependence on the oscillation frequency or the excitation frequency.

In another embodiment, the means 120 for exciting includes means for regulating the excitation amplitude, an excitation frequency or an excitation phase by a feedback branch via which the oscillation of the oscillatory structure 110 is detectable. Exemplarily, the oscillatory structure 110, together with the means 120 for exciting and the feedback branch, can form a resonant circuit oscillating at a self-resonance of the oscillatory structure 110.

In another embodiment, the means 120 for exciting may be formed such that the oscillation of the oscillation frequency is excited, while other resonant modes of the oscillatory structure 110 essentially remain unexcited or are suppressed. In one realization of the oscillatory structure 110, this may comprise a mechanical structure capable of oscillating in a first oscillation or vibrational mode and a second oscillation mode, wherein the two oscillation modes comprise a coupling which depends on the measured quantity. The oscillatory structure 110 can be caused to oscillate in the first oscillation mode by an excitation with the excitation frequency by the means for exciting 120 and the oscillatory structure 110 can be coupled to the means for processing 130 such that a signal becomes available as a detectable oscillation signal for the means for processing 130 which results from an oscillation of the mechanical structure in the second oscillation mode. The oscillatory structure 110 can be made up of two oscillators coupled to each other, wherein it may also be conceivable to use a single oscillator capable of oscillating in several oscillation modes which are also coupled.

The evaluating means 140 in one embodiment may comprise force-feedback means for counteracting the oscillation of the mechanical structure in the second oscillation mode depending on the oscillation signal processed or sampled, wherein the evaluating means 140, when determining the measured quantity, can determine same depending on the counteracting degree. In general, determining the measured quantity is also conceivable without a compensation circuit, i.e. force-feedback circuit, and without adjusting the detection oscillation.

In addition, in another realization the means for exciting 120 can comprise means for regulating the excitation amplitude, the excitation frequency or the excitation phase by a feedback branch via which a feedback signal resulting from the oscillation of the mechanical structure in the first oscillation mode is detectable, wherein another sampling means for sampling the feedback signal by another sample frequency is connected into the feedback branch, which may also depend on the excitation frequency. Exemplarily, DA or AD transducers employed for this may be operated by a clock frequency which is also based on the adjusting frequency. In another embodiment, a digital filter for filtering the feedback signal sampled may be coupled into the feedback branch.

In another embodiment, the evaluating means 140 may also comprise a digital filter for filtering the oscillation signal sampled. Embodiments offer a way of operating the digital filters by a clock frequency which may result from one of the oscillation frequencies. In addition, embodiments can comprise means for establishing a fixed clock ratio between the sample frequency on the one hand and the excitation frequency or the oscillation frequency on the other hand. Thus, the measured quantity may generally be a rotational rate of a rotation of the measuring device or an acceleration to be measured so that embodiments can generally also be employed as acceleration sensors.

Gyroscopes or rotational rate sensors may, for example, be used to technically realize the oscillatory structure. Naturally, the detection oscillation, i.e. the oscillation signal, may be of the same frequency as the excitation frequency. Thus, the excitation frequency may coincide with the resonant frequency of the gyroscope or sensor, however, it is in principle also conceivable to operate a gyroscope or a sensor by another frequency. The detection oscillation of a gyroscope or sensor in many cases has the same frequency as the excitation oscillation since the excitation oscillation provides the energy for the detection oscillation via coupling which is proportional to the rotational rate.

With regard to a possible subsequent signal-processing circuit, it is to be mentioned here that in the end even poles and zero values of the regulator transfer functions required for stabilizing the excitation amplitude and for adjusting force-feedback voltages which may be used here are coupled to the frequencies of the sensor, wherein these frequencies, too, may coincide with the resonant frequencies of the sensor, this, however, is not absolutely necessary.

FIG. 2 illustrates an embodiment of a measured quantity sensor 200. FIG. 2 shows a measured quantity sensor 200 comprising an oscillatory structure 210 having a first detection terminal 212 where an oscillation signal is detectable and an excitation terminal 214, wherein the oscillatory structure may be excited to result in an oscillation of an oscillation frequency by applying an excitation signal of an excitation frequency to the excitation terminal 214. The measured quantity sensor 200 additionally shows an excitation circuit 220 having an output 224 coupled to the excitation terminal 214, and a signal processor 230 having an input 232 coupled to the first detection terminal 212, a frequency input 234 to which a signal may be applied of a frequency which depends on the oscillation frequency of the oscillatory structure 210 or the excitation frequency at the excitation terminal 214, and an output 236. In addition, the measured quantity sensor 200 comprises an evaluation circuit 240 having an input 246 coupled to the output 236 of the signal processor, and an output 248 representing a measured quantity sensor output of the measured quantity sensor 200.

The signal processor 230 in one embodiment may, for example, be realized by a sampler the frequency input 234 of which corresponds to a sample frequency input. In other embodiments, the signal processor 230 may, for example, comprise a filter the filter characteristic of which depends on the oscillation frequency or the excitation frequency. A possible realization would, for example, be an analog filter the filter characteristic of which depends on an impedance which in turn is adjustable in dependence on the oscillation frequency or the excitation frequency.

In one embodiment of a measured quantity sensor 200, the excitation circuit 220 may form a control loop for regulating the excitation frequency, an excitation amplitude or an excitation phase with a feedback branch, via which the oscillations of the oscillatory structure 210 are detectable. In addition, the oscillatory structure 210 may comprise a mechanical structure capable of oscillating in a first oscillation mode and a second oscillation mode. Thus, the two oscillation modes are coupled, wherein the coupling depends on the measured quantity of the measured quantity sensor 200 to be measured, and the mechanical structure is excitable to result in an oscillation in the first oscillation mode by applying the excitation signal to the excitation terminal 214. An oscillation signal resulting from an oscillation of the mechanical structure in the second oscillation mode may be detectable at the first detection terminal 212. The oscillatory structure 210 can be made up of two oscillators coupled to each other, however, it is also conceivable to use a single oscillator which can oscillate in several oscillation modes which are also coupled.

In another embodiment, the evaluation circuit 240 may include a force-feedback circuit and the oscillatory structure 210 may additionally comprise a force-feedback terminal where the oscillation of the mechanical structure in the second oscillation mode can be counteracted. Thus, there is a way of connecting a force-feedback circuit between the output 236 of the signal processor 230 and the terminal 246 of the evaluation circuit 240. The force-feedback circuit here may comprise and output coupled to the force-feedback terminal of the oscillatory structure 210. In general, however, measurement without adjusting the detection oscillation is also conceivable.

In another realization, the excitation circuit 220 can form a control loop with a feedback branch and the oscillatory structure 210 can additionally comprise a detection terminal where the oscillation of the mechanical structure in the first oscillation mode is detectable. The feedback branch can thus be coupled to the second detection terminal and another sampler having a sample frequency input can be coupled therein, to which a signal of a frequency depending on the excitation frequency at the excitation terminal 214 may be applied. Exemplarily, DA or AD transducers employed here can be operated by a clock frequency which is also based on the adjusting frequency.

The control loop for controlling a force feedback can be designed such that modes different from one of the desired oscillation modes of the mechanical structure are suppressed or remain unexcited. In addition, a digital filter can be connected into the feedback branch of the further sampler and there is the possibility of the evaluation circuit 240 comprising a digital filter having an input coupled to the output 236 of the signal processor 230.

In another embodiment, the evaluation circuit 220 can be operated by a clock derived from one of the oscillation frequencies. In addition, the measured quantity can correspond to a rate of rotation of a rotation of the measured quantity sensor 200, however, in general any accelerations or forces are conceivable as measured quantities. In addition, there is the possibility of the measured quantity sensor 200 comprising a clock multiplier having an input and an output, by means of which it is connected between the excitation circuit 220 on the input side and the signal processor 230 which may be realized as a sampler on the output side such that a sample frequency at the frequency input 234 has a fixed clock ratio to the excitation frequency or oscillation frequency. Thus, it would be conceivable to select a system clock for digital signal processing for processing the sampled oscillation signal to be correspondingly higher than the sample frequency itself. If a fixed clock ratio is known, there will in principle be the possibility of designing the digital signal processing such that the problems and adjusting difficulties caused by manufacturing tolerances of the oscillation structure are reduced considerably.

Figure 3:
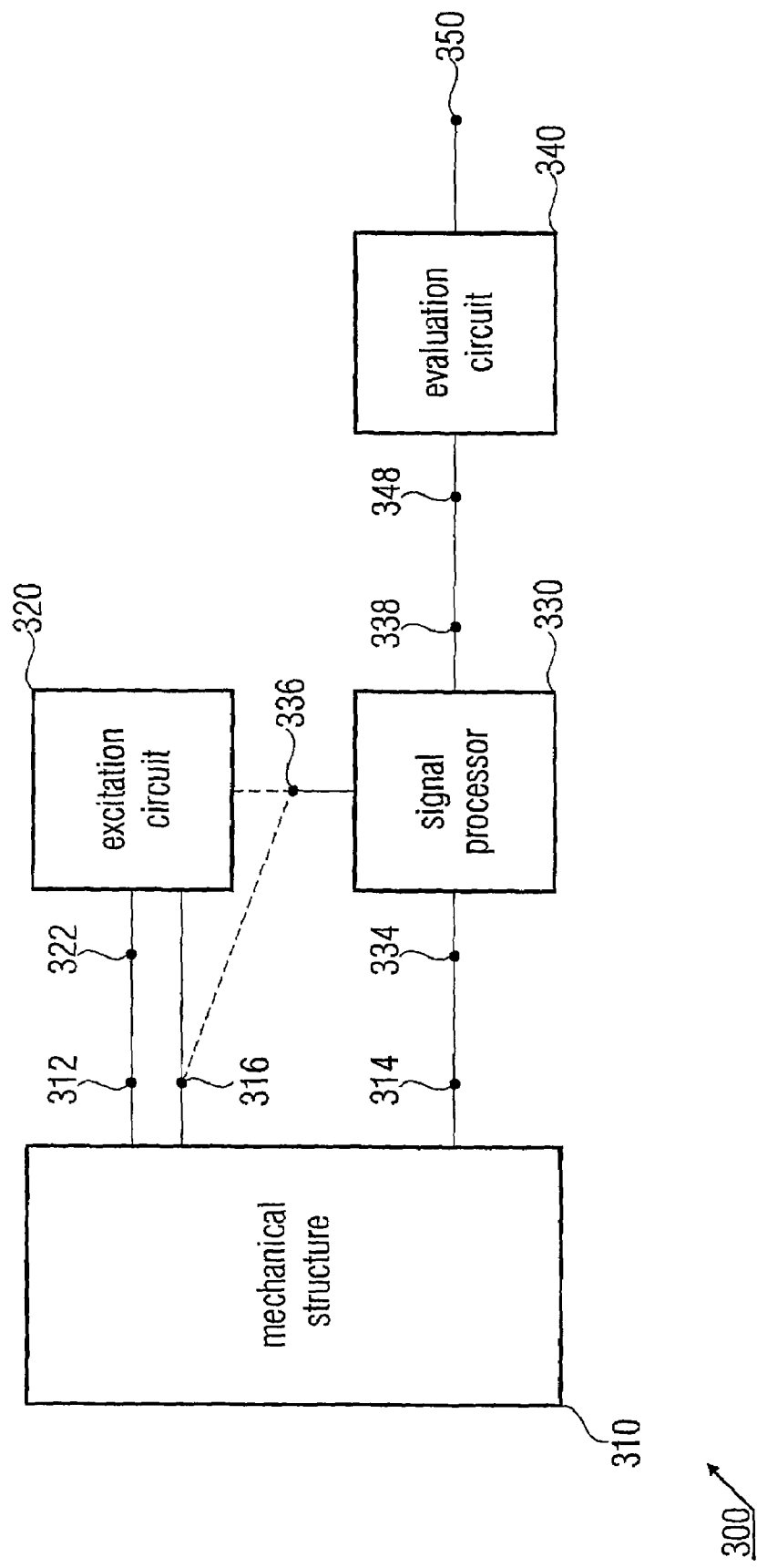
FIG. 3 shows another embodiment of a measured quantity sensor.

FIG. 3 shows another embodiment of a measured quantity sensor 300 comprising a mechanical structure 310 capable of oscillating in a first oscillation mode and a second oscillation mode which comprise coupling depending on a measured quantity of the measured quantity sensor to be measured. Again, gyroscopes or rotational rate sensors may be employed here. In addition, the mechanical structure 310 includes a first excitation terminal 312 where an oscillation of the mechanical structure 310 of an oscillation frequency in the first oscillation mode is excitable by exciting it by an excitation frequency. In addition, the mechanical structure 310 includes a first detection terminal 314 where an oscillation of the mechanical structure in the second oscillation mode is detectable. Furthermore, the mechanical structure 310 comprises a second detection terminal 316 where the oscillation of the mechanical structure 310 in the first oscillation mode is detectable. The measured quantity sensor 300 additionally includes an excitation circuit 320 having an output 322 coupled to the first excitation terminal 312, wherein the excitation circuit 320 forms a control loop with a feedback branch coupled to the second detection terminal 316. In addition, the measured quantity sensor 300 comprises a signal processor 330 having an input 334 coupled to the first detection terminal 314, a frequency input 336 coupled to a circuit part of the excitation circuit 320 where the excitation frequency at the first excitation terminal 312 is detectable or to the second detection terminal 316, and an output 338. In addition, the measured quantity sensor 300 includes an evaluation circuit 340 having an input 348 coupled to the output 338 of the signal processor 330 and an output 350 representing a measured quantity sensor output of the measured quantity sensor 300.

In one embodiment, the signal processor 330 in turn may be realized by a sampler, the frequency input 336 corresponding to a sample frequency input. In addition, the signal processor 330 in other embodiments may, for example, comprise a filter the filter characteristic of which depends on the oscillation frequency or the excitation frequency. A possible realization would, for example, be an analog filter the filter characteristic of which depends on an impedance which in turn is adjustable in dependence on the oscillation frequency or the excitation frequency.

In one embodiment, the evaluation circuit 340 can comprise a force-feedback circuit, wherein the measured quantity sensor 300 can additionally comprise a second excitation terminal where the oscillation of the mechanical structure 310 in the second oscillation mode can be counteracted, wherein the force-feedback circuit may, for example, be connected between the output 338 of the signal processor 330 and the input 348 of the evaluation circuit 340 and comprises an output coupled to the second excitation terminal.

Additionally, in another realization of an embodiment, another sampler can be connected into the feedback branch of the control loop of the excitation circuit 320, the sample frequency input of which is coupled to the circuit part of the excitation circuit 320 where the excitation frequency is detectable. In addition, a digital filter can be connected into the feedback branch of the control loop of the excitation circuit 320 downstream of the further sampler. In addition, the evaluation circuit 320 may comprise a digital filter having an input which may be coupled to the output 338 of the signal processor. In this embodiment of a measured quantity sensor 300, too, the measured quantity can correspond to a rate of rotation of a rotation or acceleration of the measured quantity sensor.

In another embodiment, the measured quantity sensor 300 may additionally comprise a clock multiplier having an input and an output by means of which it is connected between the excitation circuit 320 on the input side and the signal processor 330 realized as a sampler on the output side such that a sample frequency at the frequency input 336 has a fixed clock ratio to the excitation frequency at the first excitation terminal 312 or the oscillation frequency.

Figure 4:
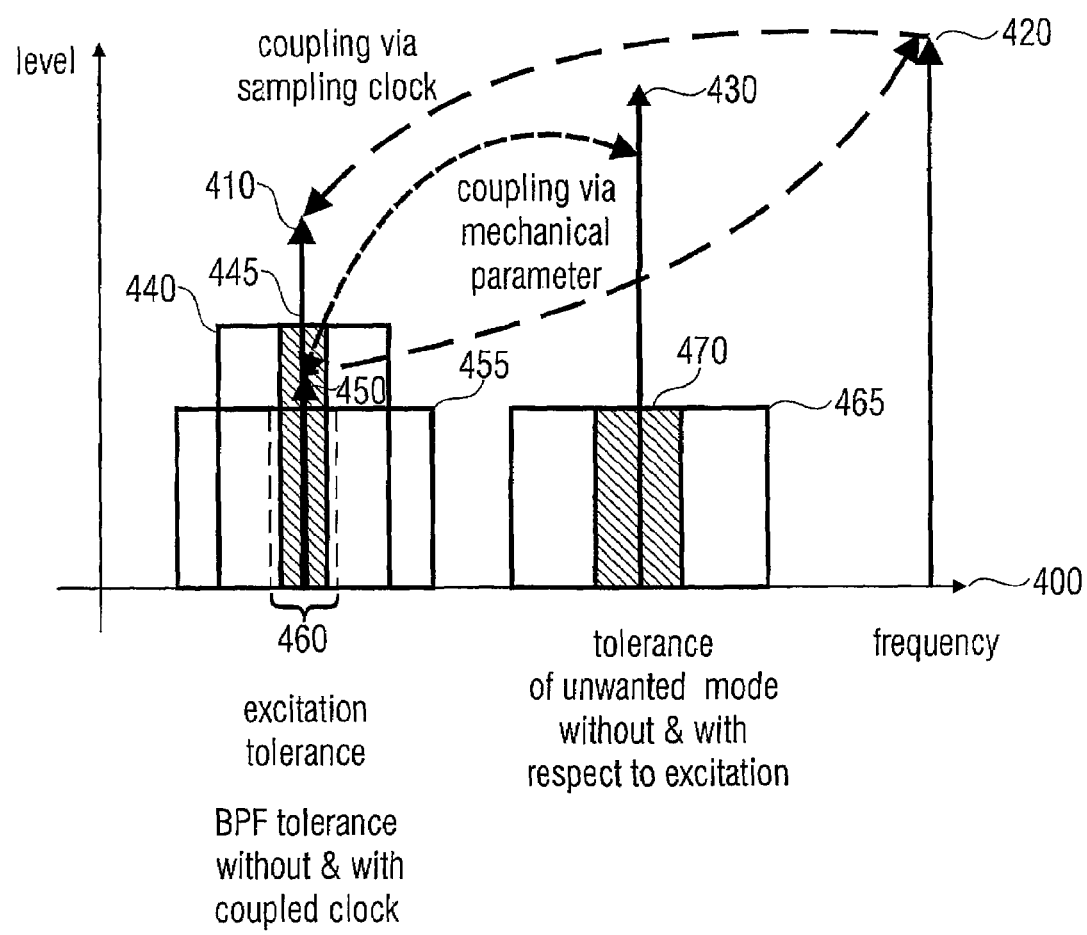
FIG. 4 is a diagram for illustrating the mode of functioning of an embodiment.

Subsequently, it is exemplarily illustrated referring to FIGS. 4 and 5 how noise transfer functions and filter functions may be in relation to the resonance of, for example, a micro-mechanical structure. It is at first illustrated in FIG. 4 how the tolerances of a bandpass filter may decrease in relation to an excitation frequency if an independent system clock of, for example, an RC oscillator is replaced by a system clock coupled to the excitation resonance. FIG. 4 shows a frequency axis 400 along which the schematic transfer functions are plotted. The oscillation frequency of a micro-mechanical structure of an embodiment is illustrated by an arrow 410, coupled thereto is a system clock 420 of subsequent digital signal processing. Exemplarily, another oscillation mode which may, for example, be caused by mechanical coupling is illustrated in FIG. 4 by the arrow 430.

In addition, the transfer functions of different bandpass filters are schematically illustrated in FIG. 4, wherein the two transfer functions 440 and 445 make clear that, when coupling the system clock to the excitation frequency, a bandpass filter having a lower tolerance, i.e. lower noise coupling-in, may be used. The transfer function 440 shows the pass bandwidth of a conventional bandpass filter, graph 445 shows the transfer function of a bandpass filter which may be employed in one embodiment, wherein the two bandpass filter transfer functions 440 and 445 refer to the excitation frequency.

It is possible to achieve similar conditions of transfer functions in a detection oscillation which in FIG. 4 is illustrated by the arrow 450. Here, too, bandpass filters which become more narrow-banded with a corresponding coupling between the system clock and the excitation frequency may be used, which is to illustrate the transfer function 455 of a conventional bandpass filter compared to the transmit bandwidth of the bandpass filter 460 which may be employed in one embodiment. Similar effects can be observed with a noise or other oscillation modes the frequency of which is at first exemplarily indicated in FIG. 4 by the arrow 430. Here, too, it may be observed that the tolerance bandwidth of this noise occurring has become considerably more narrow-banded, wherein the tolerance bandwidth of a conventional system is illustrated by the schematic transfer function 465 and the tolerance bandwidth in one embodiment is illustrated by graph 470.

Figure 5:
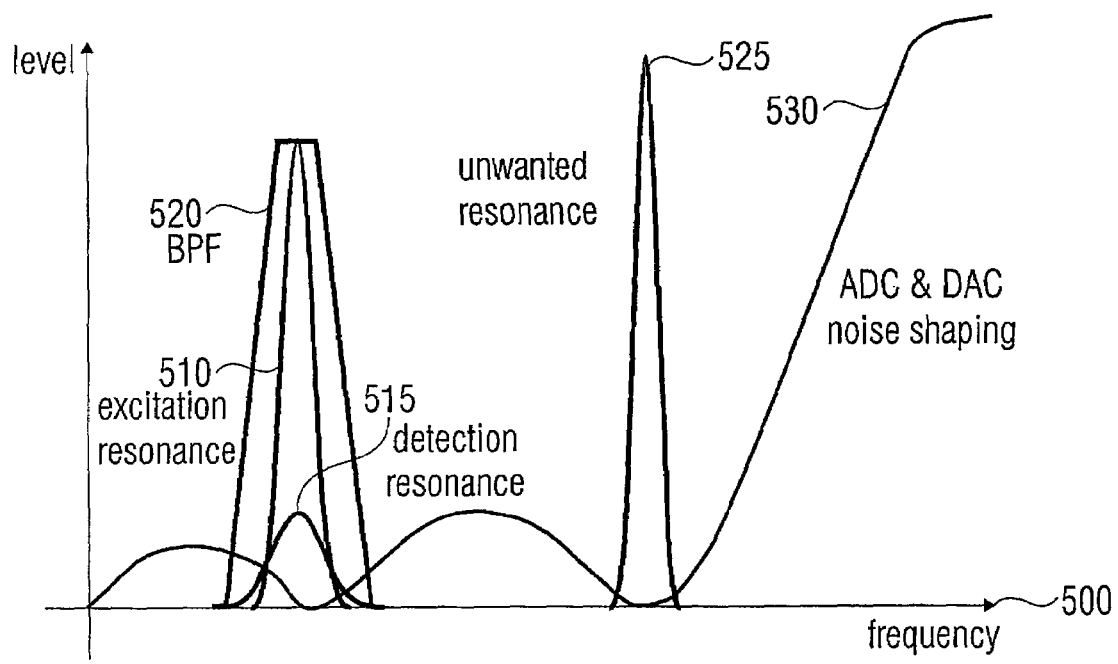
FIG. 5 is an illustration of exemplary spectra during operation of an embodiment of a measured quantity sensor.

FIG. 5 shows a frequency axis 500 along which the different spectra and transfer functions are plotted. FIG. 5 at first shows the spectrum of an excitation signal 510 and the spectrum of a detection signal 515. Based on an embodiment, a corresponding narrow-banded bandpass filter having a transfer function 520 may be used both for filtering the excitation oscillation and for filtering the detection oscillation. If there is noise, exemplarily due to undesired mechanical coupling which may cause undesired other oscillation modes, as is exemplarily illustrated in FIG. 5 by the spectrum 525, they may exemplarily be compensated by the transfer function of analog-to-digital transducers or digital-to-analog transducers since the clocking thereof may also be coupled to the excitation frequency. FIG. 5 exemplarily shows the graph 530 of such an analog-to-digital transducer or digital-to-analog transducer the transfer function of which has a strong attenuation at the undesired resonance 525.

FIGS. 4 and 5 show that embodiments of measured quantity sensors and measuring devices can also suppress undesired resonances which are not necessarily to be excited by, for example, quantizing noise. Exemplarily, further zero values can be realized in the noise transfer functions of the analog-to-digital or digital-to-analog transducers. The undesired resonances of a mechanical structure already described above, in particular those of a frequency close to the excitation frequency, may be influenced extensively by the same physical parameters as the excitation resonance, such as, for example, by oscillating masses, filter constants, attenuation constants, etc. The result for these resonances is a parameter synchronism which may be utilized by coupling the system clock to the excitation frequency. The result is a decrease in adjusting errors caused by manufacturing tolerances or temperature dependencies.

Figure 6:
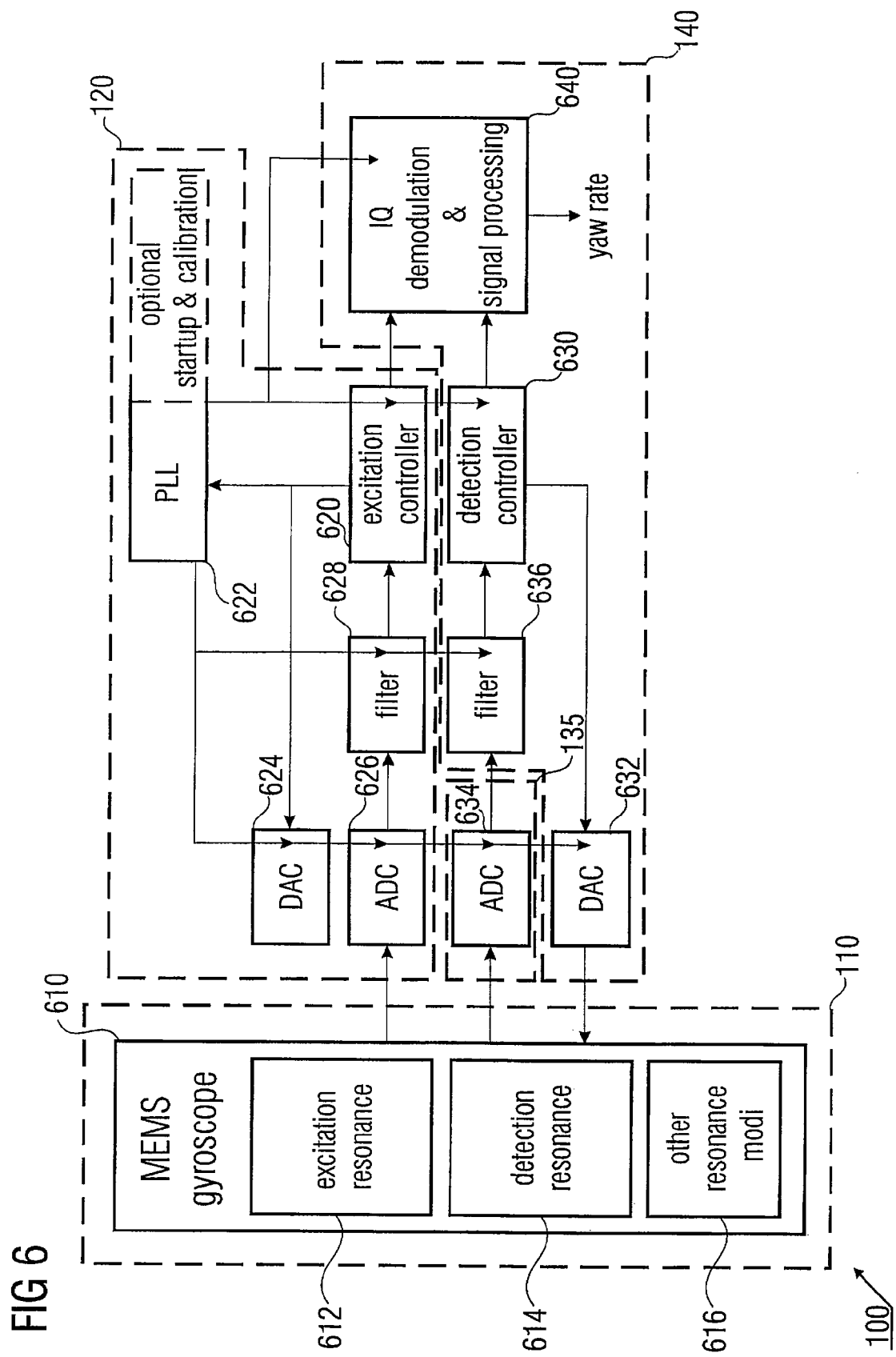
FIG. 6 shows a technical realization of an embodiment.

FIG. 6 shows another embodiment. In FIG. 6 the components of the measuring device 100, following FIGS. 1a and 1b, are illustrated again by broken lines. FIG. 6 shows a measuring device 100 for determining a measured quantity by an oscillatory structure 110 where an oscillation signal is detectable. The oscillatory structure 110 is realized in FIG. 6 by a micro-mechanical gyroscope 610, a so-called MEMS (micro-electromechanical system). The gyroscope here comprises a first resonance circuit 612 and a second resonance circuit 614. The first resonance circuit 612 forms the excitation resonance circuit, the second resonance circuit 614 forms the detection resonance circuit. In addition, the gyroscope 610 can also include other resonance modes 616.

The excitation resonance circuit 612 according to FIG. 6 is driven by means 120 for exciting the oscillatory structure 110 by an excitation frequency to result in an oscillation of an oscillation frequency. The means 120 for exciting the oscillatory structure 110 in FIG. 6 is realized by an excitation regulator 620 coupled to a PLL (phase locked loop) 622, a digital-to-analog transducer 624, an analog-to-digital transducer 626 and a digital filter 628. Correspondingly, the excitation regulator 620 in the embodiment of FIG. 6 operates in the digital range and defines the excitation frequency for the PLL 622. The excitation resonance circuit 612 of the gyroscope 610 is coupled to the excitation regulator 620 via the digital-to-analog transducer 624, wherein the excitation signal is again detected via the analog-to-digital transducer 626 and filtered via the digital filter 628, wherein the output of the digital filter 628 in turn is coupled to the excitation regulator 620. Thus, the result is a control loop.

According to the measuring device 100 in the embodiment of FIG. 6 it further includes means 130 for processing the oscillation signal with a frequency depending on the oscillation frequency or the excitation frequency. The means 130 for processing in this embodiment is realized as means 135 for sampling according to FIG. 1b. The means 135 for sampling is realized by the AD transducer 634 which also receives the clock of the PLL 622.

The measuring device 100 in FIG. 6 additionally comprises evaluating means 140 including a digital filter 636, a detection regulator 630, a DA transducer 632 and a processor for IQ demodulation and signal processing 640, wherein all these components are coupled to the clock of the PLL 622. The detection regulator 630 can influence the detection oscillation of the detection resonance circuit 614 of the gyroscope 612 via the digital-to-analog transducers 632, wherein the oscillation signal of the resonance circuit 614 is detected by the analog-to-digital transducer 634 of the means 135 for sampling the output of which is coupled to the detection regulator 630 via the digital filter 636, which is how the detection control loop is closed. Thus, it is possible for the detection regulator 630 to adjust the detection oscillation and determine an adjustment signal based thereon. This type of operation is also referred to as force-feedback operation which, however, is not absolutely necessary for detecting the measured quantity and in the embodiment in FIG. 6 is illustrated exemplarily.

The system clock of all the components of the evaluating means 140 is predefined by the PLL 622. Both the excitation regulator 620 and the detection regulator 630 can pass on output signals to a processor for IQ demodulation and signal processing 640 which, based on these signals, determines the measured quantity which in FIG. 6 is referred to as yaw rate.

In general, the signal paths of sensors according to embodiments to not deviate from conventional realizations, wherein it can be seen in the embodiment of FIG. 6 that additionally a PLL 622 is coupled to the oscillator loop of the excitation oscillation, preferably at the digital output of the excitation regulator 620. The PLL 622 generates the system clock which can be higher than the excitation frequency by a constant factor in accordance with well-known methods.

Figure 7:
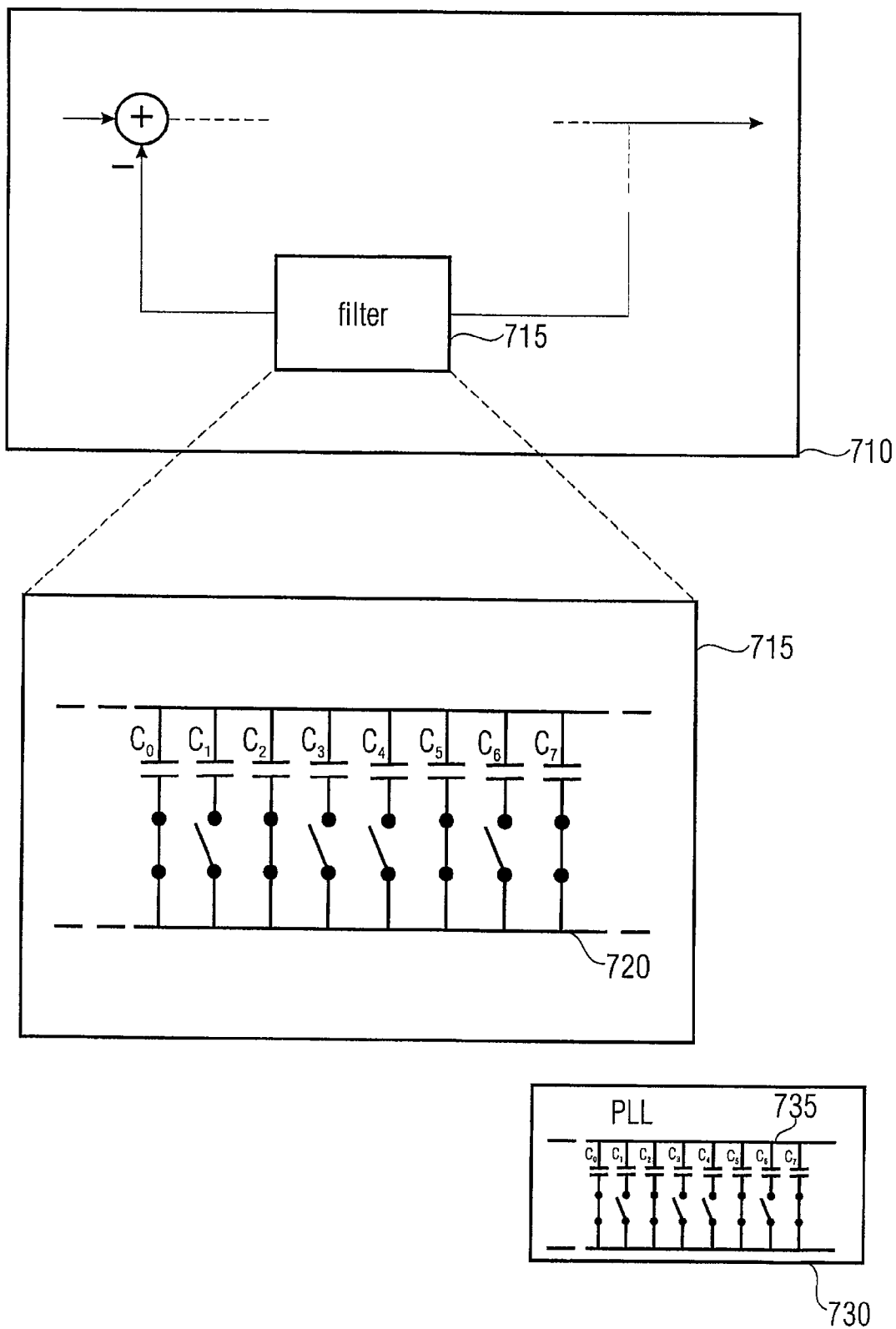
FIG. 7 shows another technical realization of an embodiment.

FIG. 7 illustrates an embodiment wherein, in accordance with FIG. 1a, the means 130 for processing comprises an analog filter. FIG. 7 shows a section of a delta-sigma transducer 710 which comprises a loop filter 715 in its feedback branch. The loop filter 715 has a filter characteristic which in the embodiment of FIG. 7 depends on an overall capacity C which in turn is realized by a cascade 720 of switchable individual capacities. The overall capacity thus results as a sum of the individual capacities switched in, wherein the individual switch positions are controlled by a PLL 730 which has an equivalent cascade 735 of individual capacities at its disposal. Since the PL 730 oscillates at the excitation frequency or oscillation frequency, this is regulated via a control circuit and thus the overall capacity of the equivalent cascade 735 is regulated, the PLL 730 has the switch positions of the equivalent cascade 735 pertaining to the oscillation frequency or excitation frequency at its disposal. They may be transferred to the cascade 720 of the loop filter 715, which is how the filter characteristic can be made dependent on the oscillation frequency or excitation frequency or be adjusted to the oscillation frequency or excitation frequency.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A measuring device for determining a measured quantity, comprising:
   an oscillatory structure in which an oscillation signal is detectable;
   an exciter configured to excite the oscillatory structure by an excitation frequency to result in an oscillation with an oscillation frequency;
   a processor configured to process the oscillation signal synchronous to the oscillation frequency or the excitation frequency; and
   an evaluator configured to determine the measured quantity based on the processed oscillation signal, wherein the oscillatory structure comprises a mechanical structure capable of oscillating in a first oscillation mode and a second oscillation mode which comprise a coupling depending on the measured quantity, wherein the oscillatory structure is excitable to result in an oscillation in the first oscillation mode by an excitation by the exciter at the excitation frequency, and the oscillatory structure is coupled to the processor such that a signal resulting from the oscillation of the mechanical structure in the second oscillation mode is available for the processor as a detectable oscillation signal.

2. The measuring device according to claim 1, wherein the processor is configured to sample an oscillation signal by a sample frequency.

3. The measuring device according to claim 1, wherein the processor comprises a filter having a filter characteristic that depends on the oscillation frequency or the excitation frequency.

4. A measuring device for determining a measured quantity, comprising:
   an oscillatory structure in which an oscillation signal is detectable;
   an exciter configured to excite the oscillatory structure by an excitation frequency to result in an oscillation with an oscillation frequency;
   a processor configured to process the oscillation signal synchronous to the oscillation frequency or the excitation frequency; and
   an evaluator configured to determine the measured quantity based on the processed oscillation signal, the processor comprising a filter having a filter characteristic depending on the oscillation frequency or the excitation frequency, wherein the filter characteristic is determined by an analog device of an impedance which depends on the oscillation frequency or the excitation frequency.

5. The measuring device according to claim 1, wherein the exciter is configured to regulate the excitation frequency, an excitation amplitude or an excitation phase by a feedback branch via which the oscillation of the oscillatory structure is detectable.

6. The measuring device according to claim 5, wherein the oscillatory structure, the exciter and the feedback branch form a resonance circuit oscillating at a self-resonance of the oscillatory structure.

7. The measuring device according to claim 1, wherein the exciter is formed such that the oscillation of the oscillation frequency is excited, while other oscillation modes of the oscillatory structure basically remain unexcited.

8. The measuring device according to claim 1, wherein the evaluator comprises force-feedback circuitry for counteracting the oscillation of the mechanical structure in the second oscillation mode depending on the oscillation signal available, and the evaluator, when determining the measured quantity, makes the determination in dependence on a counteracting degree of the counteraction.

9. The measuring device according to claim 1, wherein the exciter is configured to regulate the excitation amplitude, the excitation frequency or the excitation phase by a feedback branch by which a feedback signal is detectable which results from the oscillation of the mechanical structure in the first oscillation mode, wherein another sampling means for sampling the feedback signal by another sample frequency which depends on the excitation frequency is connected into the feedback branch.

10. The measuring device according to claim 9, wherein a first digital filter for filtering the sampled feedback signal is connected into the feedback branch.

11. The measuring device according to claim 10, wherein the evaluator comprises a second digital filter for filtering the oscillation signal available or sampled.

12. The measuring device according to claim 10, wherein the first digital filter is operated by a clock frequency derived from one of the oscillation frequencies.

13. The measuring device according to claim 1, wherein the measured quantity corresponds to a rotational rate of a rotation of the measuring device.

14. The measuring device according to claim 2, further comprising means for establishing a fixed clock ratio between the sample frequency on the one hand and the excitation frequency or the oscillation frequency on the other hand.

15. A measured quantity sensor comprising:
an oscillatory structure comprising a first detection terminal at which an oscillation signal is detectable, and an excitation terminal, wherein the oscillatory structure is excitable to result in an oscillation with an oscillation frequency by applying an excitation signal with an excitation frequency to the excitation terminal;
an excitation circuit comprising an output coupled to the excitation terminal;
a signal processor comprising an input coupled to the first detection terminal, a frequency input to which a signal of a frequency which depends on the oscillation frequency of the oscillatory structure or the excitation frequency at the excitation terminal may be applied, and an output; and
an evaluation circuit comprising an input coupled to the output of the signal processor, and an output representing a measured quantity sensor output of the measured quantity sensor, wherein the oscillatory structure comprises a mechanical structure capable of oscillating in a first oscillation mode and a second oscillation mode which comprise a coupling which depends on a measured quantity of the measured quantity sensor to be measured, wherein the mechanical structure is excitable to result in an oscillation in the first oscillation mode by applying the excitation signal to the excitation terminal, and a signal which results from an oscillation of the mechanical structure in the second oscillation mode is detectable as the oscillation signal at the first detection terminal.

16. The measured quantity sensor according to claim 15, wherein the signal processor comprises a sampler comprising a sample frequency input coupled to the frequency input.

17. The measured quantity sensor according to claim 15, wherein the signal processor additionally comprises a filter having a filter characteristic that depends on the oscillation frequency or the excitation frequency.

18. A measured quantity sensor, comprising:
an oscillatory structure comprising a first detection terminal at which an oscillation signal is detectable, and an excitation terminal, wherein the oscillatory structure is excitable to result in an oscillation with an oscillation frequency by applying an excitation signal with an excitation frequency to the excitation terminal;
an excitation circuit comprising an output coupled to the excitation terminal;
a signal processor comprising an input coupled to the first detection terminal, a frequency input to which a signal of a frequency which depends on the oscillation frequency of the oscillatory structure or the excitation frequency at the excitation terminal may be applied, and an output; and
an evaluation circuit comprising an input coupled to the output of the signal processor, and an output representing a measured quantity sensor output of the measured quantity sensor, wherein the signal processor additionally comprises a filter having a filter characteristic depending on the oscillation frequency or the excitation frequency, wherein the filter characteristic is determined by an analog device of an impedance which depends on the oscillation frequency or the excitation frequency.

19. The measured quantity sensor according to claim 15, wherein the excitation circuit forms a control loop for regulating the excitation frequency, an excitation amplitude or an excitation phase with a feedback branch, via which the oscillation of the oscillatory structure is detectable.

20. The measured quantity sensor according to claim 15, wherein the evaluation circuit comprises a force-feedback circuit and the oscillatory structure additionally comprises a force-feedback terminal where the oscillation of the mechanical structure in the second oscillation mode can be counteracted, wherein the force-feedback circuit is connected between the output of the signal processor and the terminal of the evaluation circuit and comprises an output coupled to the force-feedback terminal.

21. The measured quantity sensor according to claim 15, wherein the excitation circuit forms a control loop with a feedback branch and the oscillatory structure additionally comprises a second detection terminal where the oscillation of the mechanical structure in the first oscillation mode is detectable, wherein the feedback branch is coupled to the second detection terminal and a further sampler comprising a sample frequency input is connected therein, to which a signal of a frequency which depends on the excitation frequency at the excitation terminal may be applied.

22. The measured quantity sensor according to claim 21, wherein the control loop for controlling a force feedback is formed such that modes other than one of the desired oscillation modes of the mechanical structure are suppressed or basically remain unexcited.

23. The measured quantity sensor according to claim 21, wherein a digital filter is connected into the feedback branch downstream of the further sampler.

24. The measured quantity sensor according to claim 15, wherein the evaluation circuit comprises a digital filter comprising an input coupled to the output of the signal processor.

25. The measured quantity sensor according to claim 15, wherein the evaluation circuit is operated by a clock derived from one of the oscillation frequencies.

26. The measured quantity sensor according to claim 15, wherein the measured quantity corresponds to a rate of rotation of a rotation of the measured quantity sensor.

27. The measured quantity sensor according to claim 16, further comprising a clock multiplier comprising an input and an output by which the clock multiplier is connected between the excitation circuit on the input side and the sampler on the output side such that a sample frequency at the sample frequency input comprises a fixed clock ratio to the excitation frequency or the oscillation frequency.

28. A measured quantity sensor, comprising:
a mechanical structure capable of oscillating in a first oscillation mode and a second oscillation mode which comprises a coupling which depends on a measured quantity of the measured quantity sensor to be measured;
a first excitation terminal at which an oscillation of the mechanical structure with an oscillation frequency in the first oscillation mode is excitable by exciting the mechanical structure by an excitation frequency;
a first detection terminal at which an oscillation of the mechanical structure in the second oscillation mode is detectable; a second detection terminal at which the oscillation of the mechanical structure in the first oscillation mode is detectable;
an excitation circuit comprising an output coupled to the first excitation terminal, wherein the excitation circuit forms a control loop with a feedback branch coupled to the second detection terminal;
a signal processor comprising an input coupled to the first detection terminal, a frequency input coupled to a circuit part of the excitation circuit where the excitation frequency at the first excitation terminal is detectable or to the second detection terminal, and an output; and
an evaluation circuit comprising an input coupled to the output of the signal processor, and an output representing a measured quantity sensor output of the measured quantity sensor.

29. The measured quantity sensor according to claim 28, wherein the signal processor comprises a sampler comprising a sample frequency input coupled to the frequency input.

30. The measured quantity sensor according to claim 28, wherein the signal processor comprises a filter having a filter characteristic that depends on the oscillation frequency or the excitation frequency.

31. The measured quantity sensor according to claim 30, wherein the filter characteristic is determined by an analog device of an impedance which depends on the oscillation frequency or the excitation frequency.

32. The measured quantity sensor according to claim 29, wherein the evaluation circuit comprises a force-feedback circuit, wherein the measured quantity sensor additionally comprises a second excitation terminal where the oscillation of the mechanical structure in the second oscillation mode can be counteracted, wherein the force-feedback circuit is connected between the output of the sampler and the input of the evaluation circuit and comprises an output coupled to the second excitation terminal.

33. The measured quantity sensor according to claim 29, wherein a further sampler is connected into the feedback branch of the control loop of the excitation circuit the sample frequency input of which is coupled to the circuit part of the excitation circuit where the excitation frequency is detectable.

34. The measured quantity sensor according to claim 33, wherein a digital filter is connected into the feedback branch of the control loop of the excitation circuit downstream of the further sampler.

35. The measured quantity sensor according to claim 28, wherein the evaluation circuit comprises a digital filter comprising an input coupled to the output of the signal processor.

36. The measured quantity sensor according to claim 28, wherein the measured quantity corresponds to a rate of rotation of a rotation of the measured quantity sensor.

37. The measured quantity sensor according to claim 28, further comprising a clock multiplier comprising an input and an output by which the clock multiplier is connected between the excitation circuit on the input side and the signal processor on the output side such that a frequency at the frequency input comprises a fixed clock ratio to the excitation frequency at the first excitation terminal or the oscillation frequency.

38. A method for determining a measured quantity by means of an oscillatory structure, comprising:
exciting the oscillatory structure by an excitation frequency to result in an oscillation with an oscillation frequency;
detecting an oscillation signal at the oscillatory structure;
processing the oscillation signal by a frequency which depends on the oscillation frequency or the excitation frequency; and
determining the measured quantity based on the oscillation signal processed, wherein the step of processing includes a step of sampling by a sample frequency which depends on the oscillation frequency or the excitation frequency, wherein the oscillatory structure comprises a mechanical structure capable of oscillating in a first oscillation mode and a second oscillation mode which comprise a coupling depending on the measured quantity, wherein exciting the oscillatory structure comprises exciting the oscillatory structure by an excitation frequency to result in an oscillation in the first oscillation mode, and sampling comprises sampling a siqnal as the detectable oscillation signal resulting from an oscillation of the mechanical structure in the second oscillation mode.

39. The method according to claim 38, wherein the step of processing includes a step of filtering by a filter characteristic, the filter characteristic depending on the oscillation frequency or the excitation frequency.

40. The method according to claim 39, wherein the step of filtering further includes a step of adjusting an impedance of an analog device in dependence on the oscillation frequency or the excitation frequency to determine the filter characteristic.

41. The method according to claim 38, wherein the step of exciting comprises regulating the excitation frequency, an excitation amplitude or an excitation phase by means of a feedback branch via which the oscillation of the oscillatory structure is detectable.

42. The method according to claim 38, wherein the step of determining comprises counteracting the oscillation of the mechanical structure in the second oscillation mode depending on the oscillation signal sampled, and determining the measured quantity depending on a counteracting degree of the counteraction.

43. The method according to claim 38, wherein the step of exciting comprises regulating the excitation frequency by means of a feedback branch via which a feedback signal is detectable resulting from the oscillation of the mechanical structure in the first oscillation mode, and the method further comprising sampling the feedback signal by another sample frequency depending on the excitation frequency.

44. The method according to claim 43, further comprising digital filtering of the sampled feedback signal.

45. The method according to claim 42, further comprising digital filtering of the oscillation signal sampled.

46. The method according to claim 38, wherein the measured quantity corresponds to a rate of rotation of a rotation of the measuring device.

47. The method according to claim 38, further comprising establishing a fixed clock ratio between the sample frequency on the one hand and the excitation frequency or the oscillation frequency on the other hand.

48. A measuring method comprising:
exciting a mechanical structure capable of oscillating in a first oscillation mode and a second oscillation mode which comprise a coupling depending on a measured quantity to be measured, by an excitation frequency to result in an oscillation of the mechanical structure of an oscillation frequency in the first oscillation mode;
detecting an oscillation of the mechanical structure in the second oscillation mode;
detecting the oscillation of the mechanical structure in the first oscillation mode;
regulating the excitation frequency, an excitation amplitude or an excitation phase depending on the detected oscillation of the mechanical structure in the first oscillation mode;
processing the detected oscillation of the mechanical structure in the second oscillation mode by a frequency depending on the excitation frequency or the oscillation frequency of the oscillation in the first oscillation mode; and
determining the measured quantity to be measured on the basis of the processed oscillation of the mechanical structure in the second oscillation mode.

49. The measuring method according to claim 48, wherein the step of processing includes a step of sampling the detected oscillation of the mechanical structure in the second oscillation mode by a sample frequency depending on the excitation frequency or the oscillation frequency of the oscillation in the first oscillation mode.

50. A computer program product comprising a program code on a computer-readable medium, the program code when executed on a computer or microcontroller performing a method for determining a measured quantity by means of an oscillatory structure, comprising: exciting the oscillatory structure by an excitation frequency to result in an oscillation of an oscillation frequency; detecting an oscillation signal at the oscillatory structure; processing the oscillation signal by a frequency which depends on the oscillation frequency or the excitation frequency; and
determining the measured quantity based on the oscillation signal processed, wherein the processing includes sampling by a sample frequency which depends on the oscillation frequency or the excitation frequency, wherein the oscillatory structure comprises a mechanical structure capable of oscillating in a first oscillation mode and a second oscillation mode which comprise a coupling depending on the measured quantity, wherein the exciting the oscillatory structure comprises exciting the oscillatory structure by an excitation frequency to result in an oscillation in the first oscillation mode, and the samplinq comprises sampling a signal as the detectable oscillation signal resulting from an oscillation of the mechanical structure in the second oscillation mode.

51. A computer program product comprising a program code on a computer-readable medium, the program code when executed on a computer or microcontroller performing a measuring method comprising:
exciting a mechanical structure capable of oscillating in a first oscillation mode and a second oscillation mode which comprise a coupling depending on a measured quantity to be measured, by an excitation frequency to result in an oscillation of the mechanical structure of an oscillation frequency in the first oscillation mode;
detecting an oscillation of the mechanical structure in the second oscillation mode; detecting the oscillation of the mechanical structure in the first oscillation mode;
regulating the excitation frequency, an excitation amplitude or an excitation phase depending on the detected oscillation of the mechanical structure in the first oscillation mode;
processing the detected oscillation of the mechanical structure in the second oscillation mode by a frequency depending on the excitation frequency or the oscillation frequency of the oscillation in the first oscillation mode; and
determining the measured quantity to be measured on the basis of the processed oscillation of the mechanical structure in the second oscillation mode.

52. A measuring device for determining a measured quantity, comprising:
a mechanical oscillatory structure in which, via an oscillation signal, a mechanical oscillation of the mechanical structure is detectable;
an exciter configured to excite the mechanical oscillatory structure by an excitation signal having a excitation frequency to result in the mechanical oscillatory structure mechanically oscillating with an oscillation frequency, the exciter being configured to regulate the excitation frequency, an excitation amplitude or an excitation phase of the excitation signal by a feedback branch via which the mechanical oscillation of the oscillatory structure is detectable, the oscillatory structure, the exciter and the feedback branch forming a resonance circuit oscillating at a self-resonance of the oscillatory structure;
a sampler configured to sample the oscillation signal of the mechanical oscillatory structure at a sample frequency synchronized to the excitation signal;
a digital filter configured to digitally filter the oscillation signal; and
a evaluator configured to determine the measured quantity based on the filtered oscillation signal.

53. A measuring device for determining a measured quantity, comprising:
an oscillatory structure in which an oscillation signal is detectable;
an exciter configured to excite the oscillatory structure by an excitation frequency to result in an oscillation with an oscillation frequency;
a processor configured to process the oscillation signal synchronous to the oscillation frequency or the excitation frequency; and
an evaluator configure to determine the measured quantity based on the processed oscillation signal, wherein the processor comprises a sampler configured to sample the oscillation signal of the oscillatory structure at a sample frequency synchronized to the oscillation frequency or the excitation frequency and comprises a digital filter having fixed filter tap coefficients so that a filter characteristic of the digital filter depends on the sample frequency.

\* \* \* \* \*